(12) United States Patent
Komamura et al.

(10) Patent No.: US 7,957,017 B2
(45) Date of Patent: Jun. 7, 2011

(54) DOCUMENT MANAGING APPARATUS

(75) Inventors: Noriyuki Komamura, Mishima (JP);
Nobuhiro Shimogori, Kawasaki (JP);
Yoshikuni Matsumura, Kawasaki (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 1852 days.

(21) Appl. No.: 11/077,702

(22) Filed: Mar. 10, 2005

(65) Prior Publication Data
US 2007/0002363 A1  Jan. 4, 2007

(51) Int. Cl.
G06F 3/12 (2006.01)
G06K 15/00 (2006.01)
G06K 9/60 (2006.01)
H04N 1/028 (2006.01)

(52) U.S. Cl. ....... 358/1.15; 358/1.16; 358/403; 382/305

(58) Field of Classification Search ............ 358/1.1, 358/1.14, 1.15, 1.16, 403, 453, 501, 538; 382/172, 305
See application file for complete search history.

(56) References Cited

U.S. PATENT DOCUMENTS
6,427,032 B1 *  7/2002  Irons et al. ............... 382/306

FOREIGN PATENT DOCUMENTS
JP  5-54081  3/1993

* cited by examiner

*Primary Examiner* — Thomas J Lett
(74) *Attorney, Agent, or Firm* — Patterson & Sheridan, LLP

(57) ABSTRACT

A document managing apparatus includes a determining unit which determines whether a document print image can be generated or not when the document is entered in file managing information in which a data file is entered, the data file constituting the document which is a managing target, a print image generating unit which generates the document print image when the determining unit determines that the document print image can be generated, the document print image being entered as the file in the file managing information, an application start-up unit which starts up an application program according to the document when the determining unit determines that the document print image cannot be generated, and a screen dump generating unit which generates a screen dump of the document entered as the file in the information based on the document displayed on a display unit by the application program started.

11 Claims, 13 Drawing Sheets

| Pass | Size | Production time | Update time | Access time |
|---|---|---|---|---|
| C:\folder1\file1.txt | 2212 | 1/10 19:00 | 1/14 19:00 | 1/15 19:00 |
| C:\folder2\file2.doc | 2231 | 1/11 08:55 | 1/15 08:55 | 1/15 09:55 |
| C:\folder3\file3.ppt | 6045 | 1/12 16:32 | 1/12 16:32 | 1/12 16:32 |
| C:\folder2\file4.xls | 4536 | 1/14 10:06 | 1/19 10:06 | 1/19 11:22 |
| C:\folder1\file5.doc | 13268 | 1/14 14:33 | 1/19 14:33 | 1/21 18:33 |
| C:\folder2\file6.ppt | 4432 | 1/16 18:41 | 1/16 18:41 | 1/16 18:41 |
| C:\folder3\file7.doc | 22455 | 1/16 23:25 | 1/21 23:25 | 1/23 23:58 |
| C:\folder2\file8.txt | 8764 | 1/21 11:33 | 1/23 11:33 | 1/23 11:31 |
| C:\folder1\file9.ppt | 4353 | 1/22 12:43 | 1/22 12:43 | 1/22 12:43 |

| Pass | Size | Production time | Update time | Access time |
|---|---|---|---|---|
| C:\folder1\file1.txt | 2212 | 1/10 19:00 | 1/14 19:00 | 1/15 19:00 |
| C:\folder2\file2.doc | 2231 | 1/11 08:55 | 1/15 08:55 | 1/15 09:55 |
| C:\folder3\file3.ppt | 6045 | 1/12 16:32 | 1/12 16:32 | 1/12 16:32 |
| C:\folder2\file4.xls | 4536 | 1/14 10:06 | 1/19 10:06 | 1/19 11:22 |
| C:\folder1\file5.doc | 13268 | 1/14 14:33 | 1/19 14:33 | 1/21 18:33 |
| C:\folder2\file6.ppt | 4432 | 1/16 18:41 | 1/16 18:41 | 1/16 18:41 |
| C:\folder3\file7.doc | 22455 | 1/16 23:25 | 1/21 23:25 | 1/23 23:58 |
| C:\folder2\file8.txt | 9000 | 1/21 11:33 | 1/23 12:01 | 1/23 12:01 |
| C:\folder1\file9.ppt | 4353 | 1/22 12:43 | 1/22 12:43 | 1/23 11:43 |
| C:\folder3\file10.doc | 3333 | 1/23 12:00 | 1/23 12:00 | 1/23 12:00 |
| C:\folder4\file11.xls | 2222 | 1/23 12:03 | 1/23 12:03 | 1/23 12:03 |

FIG. 6

| Sequence | Document ID | Status | Page number | Document time | File name (pass) | Color ID |
|---|---|---|---|---|---|---|
| 1 | 1008 | Completion | 4 | 1/23 11:31 | C:\folder2\file8.txt | 2 |
| 2 | 1009 | Completion | 5 | 1/22 12:43 | C:\folder1\file9.ppt | 1 |
| 3 | 1007 | Completion | 6 | 1/21 23:25 | C:\folder3\file7.doc | 3 |
| 4 | 1005 | Completion | 1 | 1/19 14:33 | C:\folder1\file5.doc | 1 |
| 5 | 1004 | Completion | 5 | 1/19 10:06 | C:\folder2\file4.xls | 2 |
| 6 | 1006 | Completion | 7 | 1/16 18:41 | C:\folder2\file6.ppt | 2 |
| 7 | 1002 | Completion | 3 | 1/15 08:55 | C:\folder2\file2.doc | 2 |
| 8 | 1001 | Completion | 3 | 1/14 19:00 | C:\folder1\file1.txt | 1 |
| 9 | 1003 | Completion | 16 | 1/12 16:32 | C:\folder3\file3.ppt | 3 |

FIG. 7

| Sequence | Document ID | Status | Page number | Document time | File name (pass) | Color ID |
|---|---|---|---|---|---|---|
| 1 | 1011 | Update | | 1/23 12:03 | C:\folder4\file11.xls | 4 |
| 2 | 1008 | Update | | 1/23 12:01 | C:\folder2\file8.txt | 2 |
| 3 | 1010 | Update | | 1/23 12:00 | C:\folder3\file10.doc | 2 |
| 4 | 1009 | Completion | 5 | 1/22 12:43 | C:\folder1\file9.ppt | 1 |
| 5 | 1007 | Completion | 6 | 1/21 23:25 | C:\folder3\file7.doc | 3 |
| 6 | 1005 | Completion | 1 | 1/19 14:33 | C:\folder1\file5.doc | 1 |
| 7 | 1004 | Completion | 5 | 1/19 10:06 | C:\folder2\file4.xls | 2 |
| 8 | 1006 | Completion | 7 | 1/16 18:41 | C:\folder2\file6.ppt | 2 |
| 9 | 1002 | Completion | 3 | 1/15 08:55 | C:\folder2\file2.doc | 2 |
| 10 | 1001 | Completion | 3 | 1/14 19:00 | C:\folder1\file1.txt | 1 |
| 11 | 1003 | Completion | 16 | 1/12 16:32 | C:\folder3\file3.ppt | 3 |

FIG. 8

| Sequence | Document ID | Status | Page number | Document time | File name (pass) | Color ID |
|---|---|---|---|---|---|---|
| 1 | 1011 | Completion | 3 | 1/23 12:03 | C:\folder4\file11.xls | 4 |
| 2 | 1008 | Completion | 4 | 1/23 12:01 | C:\folder2\file8.txt | 2 |
| 3 | 1010 | Completion | 10 | 1/23 12:00 | C:\folder3\file10.doc | 2 |
| 4 | 1009 | Completion | 5 | 1/22 12:43 | C:\folder1\file9.ppt | 1 |
| 5 | 1007 | Completion | 6 | 1/21 23:25 | C:\folder3\file7.doc | 3 |
| 6 | 1005 | Completion | 1 | 1/19 14:33 | C:\folder1\file5.doc | 1 |
| 7 | 1004 | Completion | 5 | 1/19 10:06 | C:\folder2\file4.xls | 2 |
| 8 | 1006 | Completion | 7 | 1/16 18:41 | C:\folder2\file6.ppt | 2 |
| 9 | 1002 | Completion | 3 | 1/15 08:55 | C:\folder2\file2.doc | 2 |
| 10 | 1001 | Completion | 3 | 1/14 19:00 | C:\folder1\file1.txt | 1 |
| 11 | 1003 | Completion | 16 | 1/12 16:32 | C:\folder3\file3.ppt | 3 |

FIG. 9

| Color ID | Color | Folder |
|---|---|---|
| 1 | #FFFF00 | C:\folder1 |
| 2 | #00FFFF | C:\folder2 |
| 3 | #FF00FF | C:\folder3 |

DOCUMENT MANAGING APPARATUS

BACKGROUND OF THE INVENTION

1. Field of the Invention

The present invention relates to a document managing apparatus and document managing program which manage a data file constituting a document.

2. Description of the Related Art

Jpn. Pat. Appln. KOKAI Publication No. H5-54081 discloses an apparatus in which electronic filing is performed to a document and filed document data is stored. In the apparatus, document search is performed as follows: during the search, the pieces of document data are rearranged in the order in which the file data having the latest final search date is put on the leading end, and a user performs the search while the documents are displayed in the rearranged order. When the user stops the search at the stage in which the necessary document is displayed. Thus, the user can search the target document by stopping the search at the time when the target document is displayed.

In some of the conventional apparatuses, a print image showing contents of the document is automatically produced at predetermined timing, and the print image is stored. In the case where the print image is automatically produced, an inquiry whether the print image is produced can be received in an application program which has produced the document. Namely, the apparatus can produce the print image of the document produced by the application program to store the print image in order to display the print image during the search by receiving the inquiry at the predetermined timing.

However, in some of application programs which produce the document, the inquiry whether the print image is produced cannot be received. In the document produced by using such application programs, the print image is not produced even if the inquiry is made.

Therefore, the document, in which the print image cannot be displayed when the user searches the document, exists in the apparatus. When the user cannot find the desired document by searching the documents based on the print images stored in the apparatus during the search, the user needs to separately search the document in which the print image cannot be produced. Thus, when both the document in which the print image can be produced and the document in which the print image cannot be produced exist in the apparatus, there is generated a situation that document searching efficiency becomes worse.

BRIEF SUMMARY OF THE INVENTION

An object of the invention is to provide a document managing apparatus and document managing program which can improve document searching efficiency.

According to an aspect of the present invention, there is provided a document managing apparatus comprising: a determining unit which determines whether a document print image can be generated or not when the document is entered in file managing information in which a data file is entered, the data file constituting the document which is a managing target; a print image generating unit which generates the document print image when the determining unit determines that the document print image can be generated, the document print image being entered as the file in the file managing information; an application start-up unit which starts up an application program according to the document when the determining unit determines that the document print image cannot be generated; and a screen dump generating unit which generates a screen dump of the document entered as the file in the file managing information based on the document displayed on a display unit by the application program started by the application start-up unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a second file managing table according to the embodiment;

FIG. 7 is a document managing table according to the embodiment;

FIG. 8 is another document managing table according to the embodiment;

FIG. 9 is still another document managing table according to the embodiment;

DETAILED DESCRIPTION OF THE INVENTION

Referring to drawings, an embodiment of the invention will be described in detail.

Figure 1:
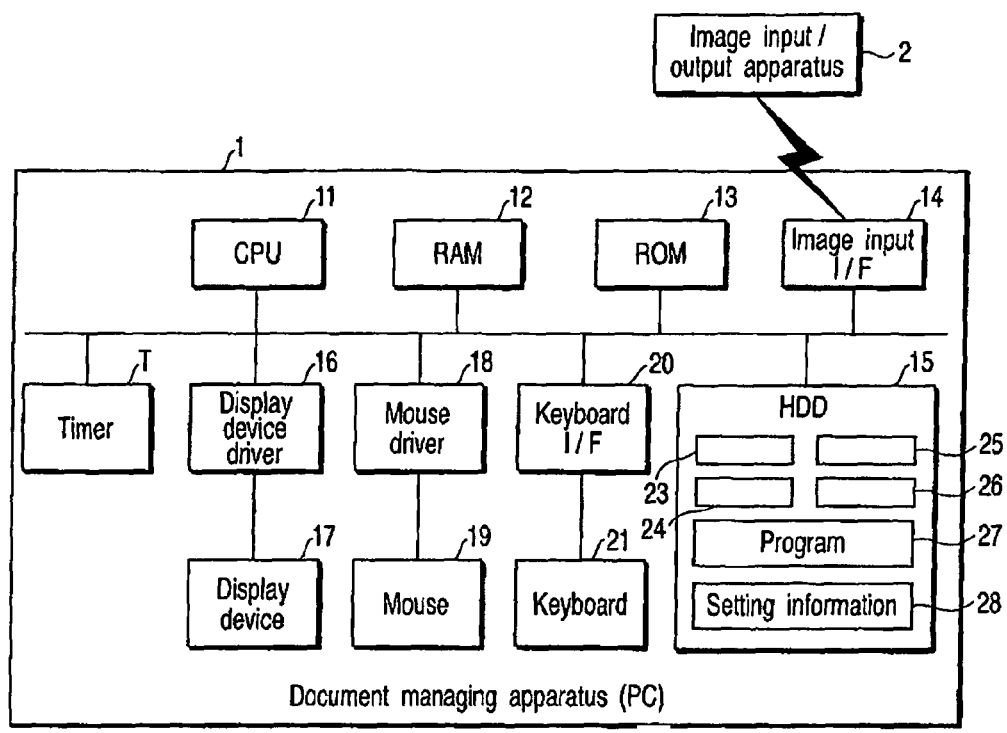
FIG. 1 is a block diagram showing schematic configuration of a document managing system and a document managing apparatus according to an embodiment of the invention.

FIG. 1 is a block diagram showing schematic configuration of a document managing apparatus 1 according to an embodiment of the invention.

The document managing apparatus 1 includes a PC and the like. The PC is connected to an image input/output apparatus 2. Any image input/output apparatus 2 can be used as long as the image input/output apparatus 2 provides an image to the document managing apparatus 1 as the PC. Examples of the image input/output apparatus 2 include a scanner, a digital multi-function peripheral (MFP) provided with the scanner, a digital camera, and a computer on a network (for example, a WWW server).

As shown in FIG. 1, the document managing apparatus 1 includes a CPU 11, a RAM 12, a ROM 13, a network interface (I/F) 14, a hard disk drive (HDD) 15, a display device driver 16, a display device 17, a mouse driver 18, a mouse 19, a keyboard interface (I/F) 20, a keyboard 21 and a timer T.

The CPU 11 controls the whole of the document managing apparatus 1. The CPU 11 realizes various functions by executing control programs stored in the ROM 13 and application programs stored in the HDD 15. The RAM 12 is a memory in which working data and the like are temporarily stored. The ROM 13 is a non-volatile memory in which a basic program to operate the document managing apparatus (PC) 1 and the like are previously stored.

The image input interface 14 inputs the image data and the like from an external device. In the configuration shown in FIG. 1, the image input interface 14 functions as the interface to obtain the image from the image input/output apparatus 2. Although only one image input interface 14 is shown in FIG. 1, it is also possible that plural image input interfaces 14 are provided in the document managing apparatus 1. Specifically, a LAN, a USB, and a wireless communication interface can be cited as examples of the image input interface 14.

The HDD 15 is a storage device including a magnetic disk. Various kinds of data are stored in the HDD 15 in a file format. The data which constitute the document which is of a managing target of the document managing apparatus 1 and the data which indicate the related information on the document are stored in the HDD 15 in the file format.

A first file managing table 23, a second file managing table 24, a document managing table 25, a color managing table 26, and the like are provided in the HDD 15.

The first file managing table 23 and the second file managing table 24 are tables in which managing information (file managing information) on the data file which constitutes the document of the managing target is stored. The document managing table 25 is the table in which managing information (document managing information) on the document of the managing target are stored. The color managing table 26 is the table in which information (color managing information) on the color related to the document of the managing target is stored. The data tables 23 to 26 will de described in detail later.

At least an application program (document managing program) 27 and setting information 28 are stored in the HDD 15. The application program 27 causes the PC to function as the document managing apparatus 1.

The document managing program 27 includes programs which cause the PC to execute various processes such a document managing information entering process, an image generating process, a document searching screen displaying process, a document map generating process, and a document searching process. These processes will be described later. By performing the document managing program 27, the PC realizes various functions such as a document managing information entering function, an image generating function, a document searching screen displaying function, a document map generating function, and a document searching function.

The display device driver 16 includes a drive circuit which controls display contents of the display device 17. The display device driver 16 functions as the interface which outputs signals of the image displayed on the display device 17 to the display device 17. The mouse driver 18 includes a circuit which detects information inputted to the mouse 19. The mouse driver 18 detects motion of the mouse 19, input to a button provided in the mouse 19, a rotating amount of a wheel provided in the mouse 19, and the like. The mouse driver 18 informs the CPU 11 of the signals which indicate the motion of the mouse 19, the input to the button provided in the mouse 19, the rotating amount of the wheel provided in the mouse 19, and the like.

The keyboard interface 20 detects the information inputted to the keyboard 21 and informs the CPU 11 of the information. The keyboard 21 includes plural keys such as characters, numerals, and symbols. The keyboard interface 20 detects the input to each key of the keyboard 21, and the keyboard interface 20 informs the CPU 11 of the signals which indicate the inputted key.

Figure 2:
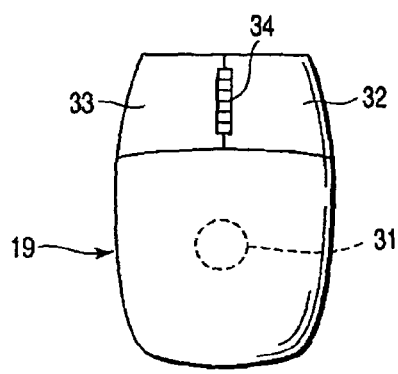
FIG. 2 shows a mouse according to the embodiment.

FIG. 2 shows a configuration of the mouse 19.

As shown in FIG. 2, the mouse 19 has a motion detecting mechanism 31, a right button 32, a left button 33, and a wheel 34. The mouse 19 is operated while placed on a plane as shown in FIG. 2. The mouse 19 shown in FIG. 2 is held by a user's hand. The user moves the mouse 19 on the plane as shown in FIG. 2, and the user operates the right button 32, the left button 33, and the wheel 34 as necessary.

The motion detecting mechanism 31 converts the motion of the mouse 19 on the plane into the signals. For example, the motion detecting mechanism 31 includes a sphere which is rotated according to the motion of the mouse 19 and a mechanism which converts the motion of the sphere into the signals. It is also possible that the motion detecting mechanism 31 includes an optical sensor which detects the motion of the mouse 19 on the plane and the mechanism which converts the mouse motion detected by the optical sensor into the signals. The motion detecting mechanism 31 is provided on the side which is in contact with the plane as shown in FIG. 2. When the user moves the mouse 19 with the mouse held in the state shown in FIG. 2, the motion detecting mechanism 31 detects the motion of the mouse on the plane. The signals which indicate the mouse motion detected by the motion detecting mechanism 31 is outputted to the mouse driver 18.

The right button 32 is one which is provided on the right side of a main body of the mouse 19 in the state shown in FIG. 2. When the user holds the main body of the mouse 19 shown in FIG. 2 by a right hand, the user operates the right button 32 by a forefinger or a middle finger of the user. The left button 33 is one which is provided on the left side of the main body of the mouse 19 in the state shown in FIG. 2. When the user holds the main body of the mouse 19 shown in FIG. 2 by the right hand, the user operates the left button 33 by the middle finger or a third finger of the user.

The wheel 34 is a rotating member which is provided near the central portion of the mouse 19 in the state shown in FIG. 2. In FIG. 2, the wheel 34 is provided between the right button 32 and the left button 33. The user operates the wheel 34 by the forefinger, the middle finger, or the third finger of the user while holding the main body of the mouse 19 in the state shown in FIG. 2.

The wheel 34 is placed so as to be rotated only in a predetermined direction. In FIG. 2, the wheel 34 is rotated in the direction from the front side to the back side (from the lower side to the upper side in FIG. 2) and in the reverse direction (from the lower side to the upper side in FIG. 2). In the following description, with reference to the rotating direction of the wheel 34, the rotating direction in which the wheel 34 is rotated from the front side to the back side (from the lower side to the upper side in FIG. 2) shall mean a normal direction, and the rotating direction in which the wheel 34 is rotated from the back side to the front side (from the lower side to the upper side in FIG. 2) shall mean the reverse direction.

The timer T generates time information. The CPU 11 times various times based on the time information generated by the timer T. The CPU 11 obtains the time information generated by the timer T as necessary in computing various times.

Then, the document displaying screen (document searching screen) managed by the document managing apparatus 1 will be described.

Figure 3:
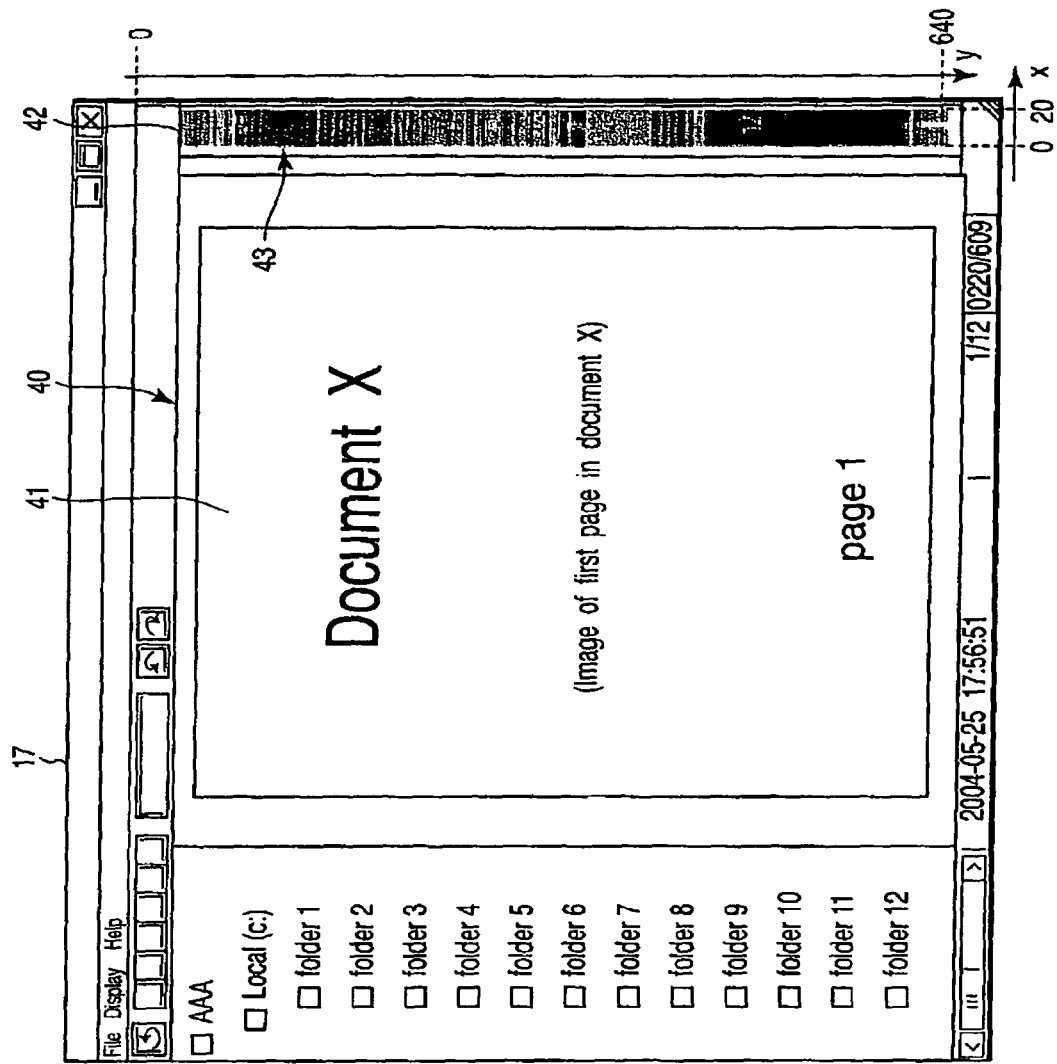
FIG. 3 shows a display example of a document searching screen according to the embodiment.

FIG. 3 shows a document searching screen (document displaying screen) 40 displayed on the display device 17 on the document managing apparatus 1.

In the document managing apparatus 1, the document searching screen 40 is displayed on a display window of the display device 17. In the document searching screen 40, as shown in FIG. 3, the image of each page which constitutes the document managed by the document managing apparatus 1 is displayed in unit of one page according to the user's operation. The user searches the desired document by referring to the image displayed on the document searching screen 40 shown in FIG. 3.

In FIG. 3, in addition to tool bars including various operation keys, an image display area 41, a document map (search bar) 42, an arrow 43, and the like are displayed on the document searching screen 40.

The image display area 41 is located in the substantial center of the document searching screen 40 displayed on the display device 17. In the image display area 41, the image of one or more pages which constitutes the document is displayed in unit of page according to the user's operation.

The document map 42 is displayed on a right end area of the document searching screen 40. In the document map 42, a bar (line) which indicates each document managed by the document managing apparatus 1 is displayed while the documents are stacked on one another in the time-series order. The document map 42 shows the state in which the documents managed by the document managing apparatus 1 are stacked. In the document map 42 shown in FIG. 3, the uppermost bar indicates the document having the latest document time (newest document), and the lowermost bar indicates the document having the earliest document time (oldest document). Namely, in the document map 42 shown in FIG. 3, the stacked bar indicates the newer document when the bar is located at upper position, and the stacked bar indicates the older document when the bar is located at lower position.

The arrow 43 is displayed in the area adjacent to the document map 42 in the document searching screen 40. The arrow 43 indicates the position of the bar on the document map 42. The bar indicates the document to which the image, displayed in the image display area 41, belongs. Namely, the arrow 43 indicates the position of the bar which shows the displayed document on the document map 42.

In the document map 42, the bar corresponding to each document is displayed by a color corresponding to each document. The color of each bar corresponding to each document displayed on the document map 42 is set, for example, in each folder in which the data file constituting the document is stored. In this case, the document in which the data is stored in the same folder is displayed in the same color, and the document in which the data is stored in the different folders is displayed in the different color. Therefore, the user can intuitively recognize the folder in which each document is stored by the color displayed in the document map 42. It is possible that the color of the bar corresponding to each document displayed in the document map 42 is set in each file extension of the document or in each application for opening the document.

Then, the change of the image displayed in the image display area 41 of the document searching screen 40 will be described.

Figures 4, 5:
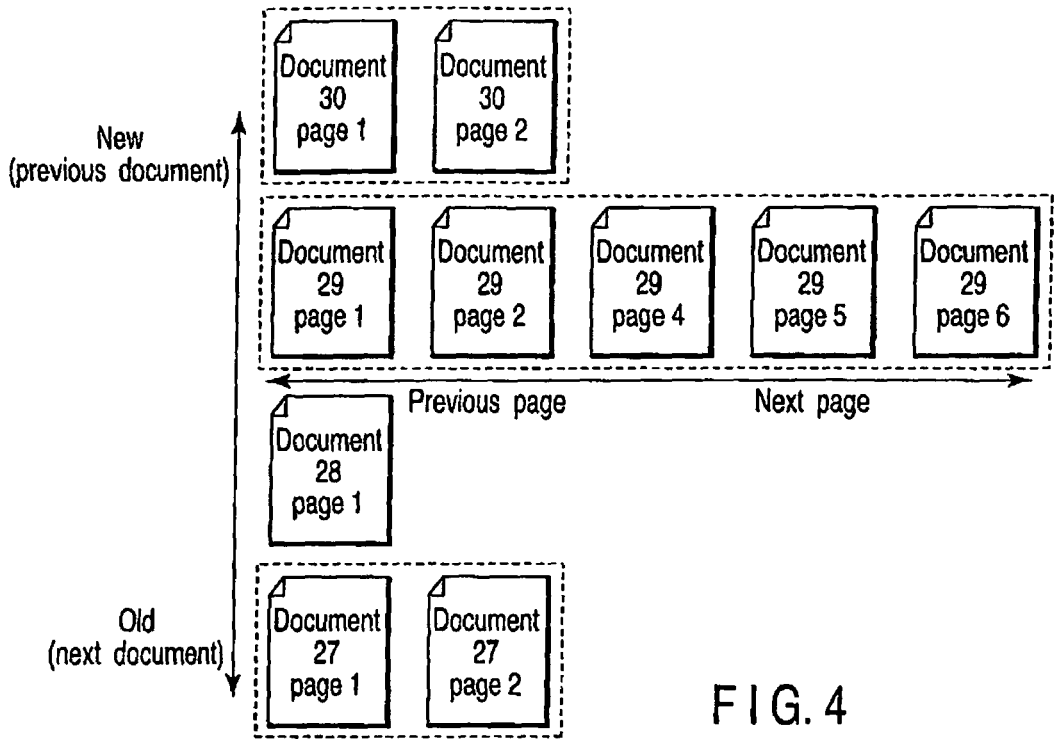
FIG. 4 shows a relationship between a document managed by the document managing apparatus according to the embodiment and an image displayed in an image display area.
FIG. 5 is a first file managing table according to the embodiment.

FIG. 4 shows a relationship between a document managed by the document managing apparatus 1 and the image displayed in the image display area 41.

Each document managed by the document managing apparatus 1 includes one or plural pages as shown in FIG. 4. The image displayed in the image display area 41 of the document searching screen 40 shown in FIG. 3 is configured to be changed in response to the input to the mouse 19 or the keyboard 21. The change of the image displayed in the image display area 41 includes the change of the document and the change of the page.

In the document managing apparatus 1, as shown in FIG. 4, the plural documents are managed in the time-series order based on the time when the document is produced or the time when the document is updated. The order of the documents is reflected in the display order of the bars corresponding to the documents which are displayed in the document map 42 while stacked. Accordingly, as shown in FIG. 3, the bars corresponding to the documents are displayed while stacked in the time-series order.

In the document managing apparatus 1, as shown in FIG. 4, the plural pages in each document are managed in the order of the page.

In the document managing apparatus 1, the document displayed in the document searching screen 40 is changed according to the operation of the mouse 19 or the keyboard 21 in the longitudinal direction (vertical direction in FIG. 3). Further, in the document managing apparatus 1, the page displayed in the document searching screen 40 is changed according to the operation of the mouse 19 or the keyboard 21 in the crosswise direction (horizontal direction in FIG. 3).

When the user performs the operation in the longitudinal direction with the mouse 19 or the keyboard 21, the document managing apparatus 1 changes the documents displayed in the image display area 41 of the document searching screen 40. As a result, the representative image (for example, the first page image in the document) of the document changed according to the user's operation in the longitudinal direction is displayed in the image display area 41 of the document searching screen 40. When the user performs the operation in the crosswise direction with the mouse 19 or the keyboard 21, the document managing apparatus 1 changes the pages displayed in the image display area 41 of the document searching screen 40. As a result, the image of the page changed according to the user's operation in the crosswise direction is displayed in the image display area 41 of the document searching screen 40.

The change of the image displayed in the image display area 41 of the document searching screen 40 in unit of document will be described below.

The user directs to change the document using an input device such as the mouse 19 and the keyboard 21. In this case, as described above, the document as the image displayed in the image display area 41 should be changed according to the operation in the longitudinal direction (vertical direction). For example, the document is changed according to the input to upward and downward cursor keys (upward key and downward key) of the keyboard 21 or the operation in the longitudinal direction by a pointing device such as the mouse 19. In the embodiment, the document is also changed according to the rotation of the wheel 34 of the mouse 19.

When the document is changed by the above operation, the first page image is displayed as the representative image of the document in the image display area 41 of the document searching screen 40. Namely, the first page image in each document is displayed in the image display area 41 each time the document is changed with the mouse 19 and the keyboard 21. In is possible that the representative image of each document is set at the particular page in the pages of each document.

When the representative image (image of the first page) is changed in the document displayed in the image display area 41, the user directs to change the document using the input device such as the mouse 19 and the keyboard 21. Then, the document managing apparatus 1 changes the first page image of the document displayed in the image display area 41 in the time-series order.

The change of the image displayed in the image display area 41 of the document searching screen 40 in unit of page will be described below.

The user directs to change the page using the input device such as the mouse 19 and the keyboard 21. In this case, as described above, the page as the image displayed in the image display area 41 should be changed according to the operation in the crosswise direction. For example, the page is changed according to the input to rightward and leftward cursor keys (rightward key and leftward key) of the keyboard.

Each time the page is changed by the above operation, the image of each page which constitutes the document is sequentially displayed in the image display area 41 of the document searching screen 40. Namely, when the particular page in the particular document is displayed in the image display area 41, the user directs to change the document to display the first page image of the desired document in the image display area 41. In such a state, when the user directs to change the page using the mouse 19 or the keyboard 21, the document managing apparatus 1 displays the image of each page which constitutes the document in the image display area 41 in the order of the page.

The data tables 23 to 26 which manage the document in the document managing apparatus 1 having the above configuration will be described below.

In the document managing apparatus 1, the data which constitute each document of the managing target is stored in the HDD 15 in the file format. The file of the data which constitutes the document stored in the HDD 15 is managed by the first file managing table 23 and the second file managing table 24. The document corresponding to the file stored in the HDD 15 is managed by the document managing table 25. The color of the bar which indicates each document in the document map 42 of the document searching screen 40 is managed by the color managing table 26.

The first file managing table 23 and the second file managing table 24 will be described below.

FIG. 5 shows a configuration of the first file managing table 23. FIG. 6 shows a configuration of the second file managing table 24.

The managing information on each file as each document managed by the document managing apparatus 1 is stored in the first file managing table 23 and the second file managing table 24.

As shown in FIGS. 5 and 6, the first file managing table 23 and the second file managing table 24 are configured so that the file managing information such as a pass, a size, a production time, an update time, an access time, and the header information is stored in the first file managing table 23 and the second file managing table 24.

The information which indicates a drive name and a folder name, in which the file exists, and the information which indicates a file name of the file are stored as the pass. The data size of the file is stored as the size. The date and time when the file is produced is stored as the production time. The date and time when the file is updated is stored as the update time. The latest date and time when access to the file is performed is stored as the access time.

The managing information of each file at a past point in time is stored in the first file managing table 23. The past point in time shall be the time when the document managing apparatus 1 is started up last time. On the other hand, a list of the current files is shown in the second file managing table 24. Accordingly, the second file managing table 24 is updated at any time according to the update and addition of the file.

For example, when the document managing apparatus 1 is started up, the information of the second file managing table 24 at this point is stored as the first file managing table, and the new second file managing table 24 is produced (updated). The managing information on the newly added file and the updated file is stored in the second file managing table 24. Namely, the difference between the file in the last-time start-up and the file in the present-time start-up is expressed as the difference between the first file managing table 23 and the second file managing table 24. In the embodiment, the update status of the file (new entry or update) is determined by the difference between the first file managing table 23 and the second file managing table 24.

As an example of the new entry of the file, it is assumed that the document managing apparatus 1 obtains the document including the images of the plural pages through the network interface 14. In this case, the data of the document obtained through the network interface 14 is stored as the new entry file in the HDD 15. At this point, a field in which the managing information on the new entry file is stored is added to the second file managing table 24, and the pass, the size, the production time, the update time, the access time, and the like are stored as the managing information of the new entry file. The information stored in the first file managing table 23 is held with no change.

As an example of the file update, it is assumed that the file having the managing information in the second file managing table 24 is updated. In this case, the updated file is stored by overwriting the already-existing file in the HDD 15. In the managing information on the updated file in the second file managing table 24, the size, the update time, the access time, the header information, and the like are updated based on the updated file. The information stored in the first file managing table 23 is also held with no change.

Then, the document managing table 25 will be described.

FIGS. 7, 8, and 9 show a configuration of the document managing table 25.

The document managing table 25 is one which manages the file, managed by the first file managing table 23, as the document. As shown in FIGS. 7, 8, and 9, in the document managing table 25, a sequence, the document ID, a status, the number of pages, a document time, the file name, a color ID, and the like are stored as the managing information on the document.

The information which indicates the display order of each document is stored as the sequence. As described above, the documents are displayed in the time-series order based on the document time in the document searching screen 40 shown in FIG. 3. Accordingly, in the document managing table 25, the document time manages the sequence of the documents in the order of the time.

The unique ID information given to each document is stored as the document ID. The ID information identifies each document.

The information which indicates the processing status of each document is stored as the status. For example, the information which indicates "update" status or the information which indicates "completion" status is stored as the status. "Completion" means the status in which the update (update or new entry) of the document is completed. "Update" means the status in which the document waits for the update (update or new entry).

The information which indicates the number of pages of the document is stored as the number of pages. The number of pages is confirmed when the status of the document becomes "completion".

The production time or the update time of each document is stored as the document time. For example, the update time of the file corresponding to the document managed by the first file managing table 23 is stored as the document time.

The information which indicates the file corresponding to the document is stored as the file name. For example, the drive name, the folder name, and the file name with respect to the file corresponding to each document are stored as the file name.

The information which indicates the color to display the information showing each document is stored in the color ID. The color ID means the unique ID information given to each color to identify the color. The information which indicates the actual color corresponding to the color ID is shown by the color managing table 26.

The document managing table 25 is updated by the process of entering the document managing information. For example, nine documents are managed in the document managing table 25 shown in FIG. 7. In such a state, the document having the document ID "1008" is updated, and the document having the document ID "1010" and the document having the document ID "1011" are newly added. In this case, in the later-mentioned process of entering the document managing information, three documents whose statuses are set at "update", (document ID "1008", document ID "1010", and document ID "1011") are entered in the document managing table 25 shown in FIG. 7. Then, the document managing table 25 shown in FIG. 8 is produced.

The statuses of the three documents of the document ID "1008", the document ID "1010", and the document ID "1011" are stored as "update" in the document managing table 25 shown in FIG. 8. As shown in FIG. 8, the later-mentioned image generating process is sequentially performed to the documents in which the status is set at "update" in the document managing table 25. In the document in which the image generating process is completed, the status is updated to "completion". Accordingly, when the image generating process to the three documents of the document ID "1008", the document ID "1010", and the document ID "1011" is completed, the document managing table 25 shown in FIG. 8 is updated to the document managing table 25 shown in FIG. 9.

The number of pages of each document should be confirmed by the number of images generated by the image generating process, which will be described later. Therefore, in the document managing table 25, the number of pages of each document whose status is "update" becomes the blank field as shown in FIG. 8. For the document whose status is changed from "update" to "completion", as shown in FIG. 9, the number of images generated by the later-mentioned image generating process is stored as the number of pages.

Because the display time and the display position are not stored unless the document is displayed for at least two seconds on the document searching screen 40, as shown in FIG. 8, some documents have blank fields. However, for example, when the document whose document ID is "1008" is displayed for at least two seconds on the document searching screen 40, the display time and the display position are updated and stored as shown in FIG. 9.

Then, the color managing table 26 will be described.

Figures 10, 14:
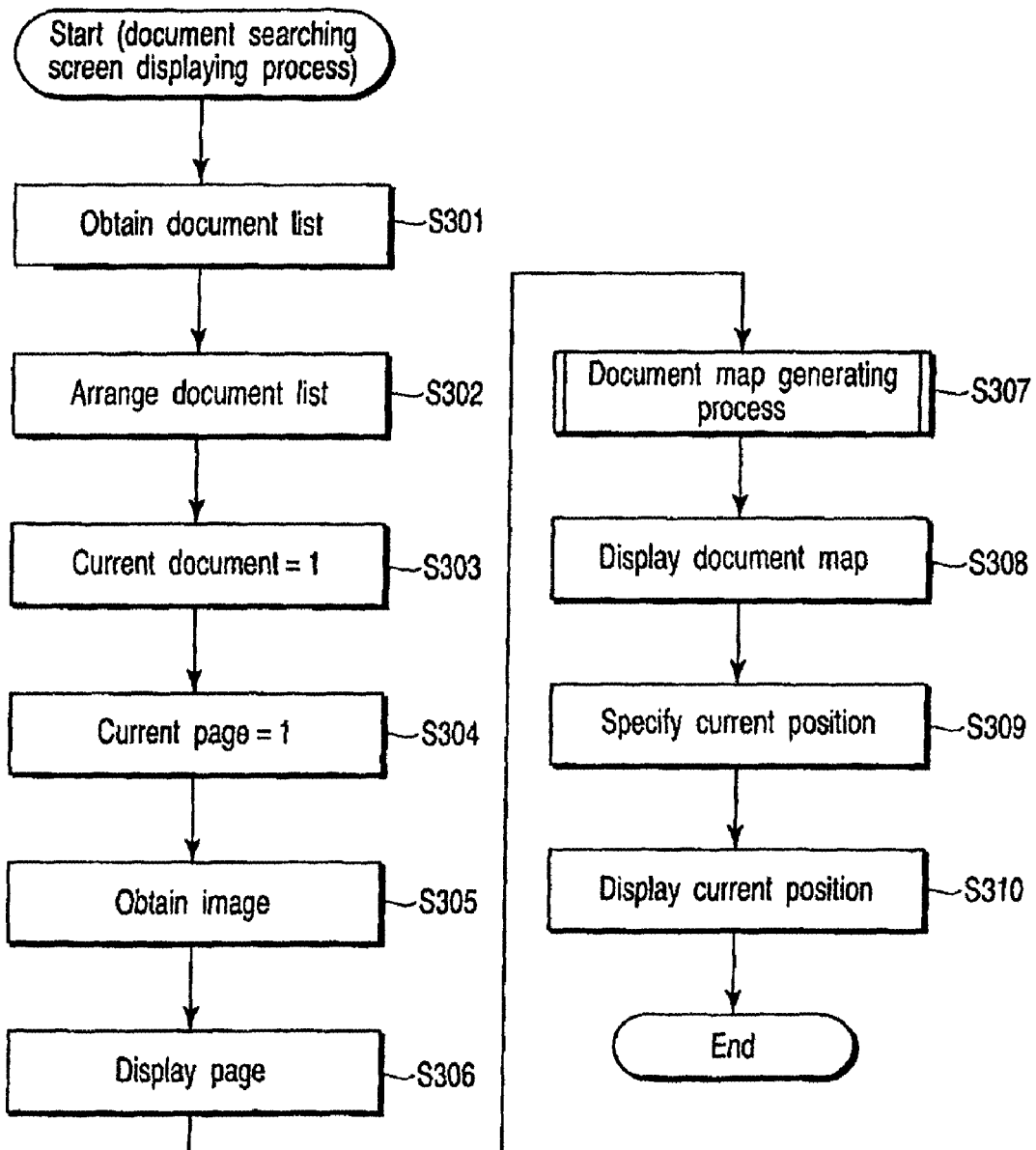
FIG. 10 is a color managing table according to the embodiment.
FIG. 14 is a flowchart for explaining a process of displaying a document searching screen according to the embodiment.

FIG. 10 shows a configuration of the color managing table 26.

The color managing table 26 is one in which the color ID, the color (information which indicates the actual color), and the folder are correlated with one another. In the document managing table 25, as described above, the color corresponding to each document is shown by the color ID. Accordingly, the color corresponding to each document is determined by the color ID of the document managing table 25 and the color of the color managing table 26. The color corresponding to each document shall mean the color of the bar corresponding to each document displayed in the document map 42 of the document searching screen 40.

As described above, in the embodiment, the color of the bar corresponding to each document displayed in the document map 42 of the document searching screen 40 is set in each folder. Accordingly, as shown in FIG. 10, the color managing table 26 shows the color ID and color which correspond to each folder. When the color of the bar corresponding to each document displayed in the document map 42 is set in each file extension or in each application which opens the document, the color ID and color which correspond to each extension or each application are stored in the color managing table 26.

Then, the process of entering the document managing information in the document managing apparatus 1 will be described.

Figure 11:
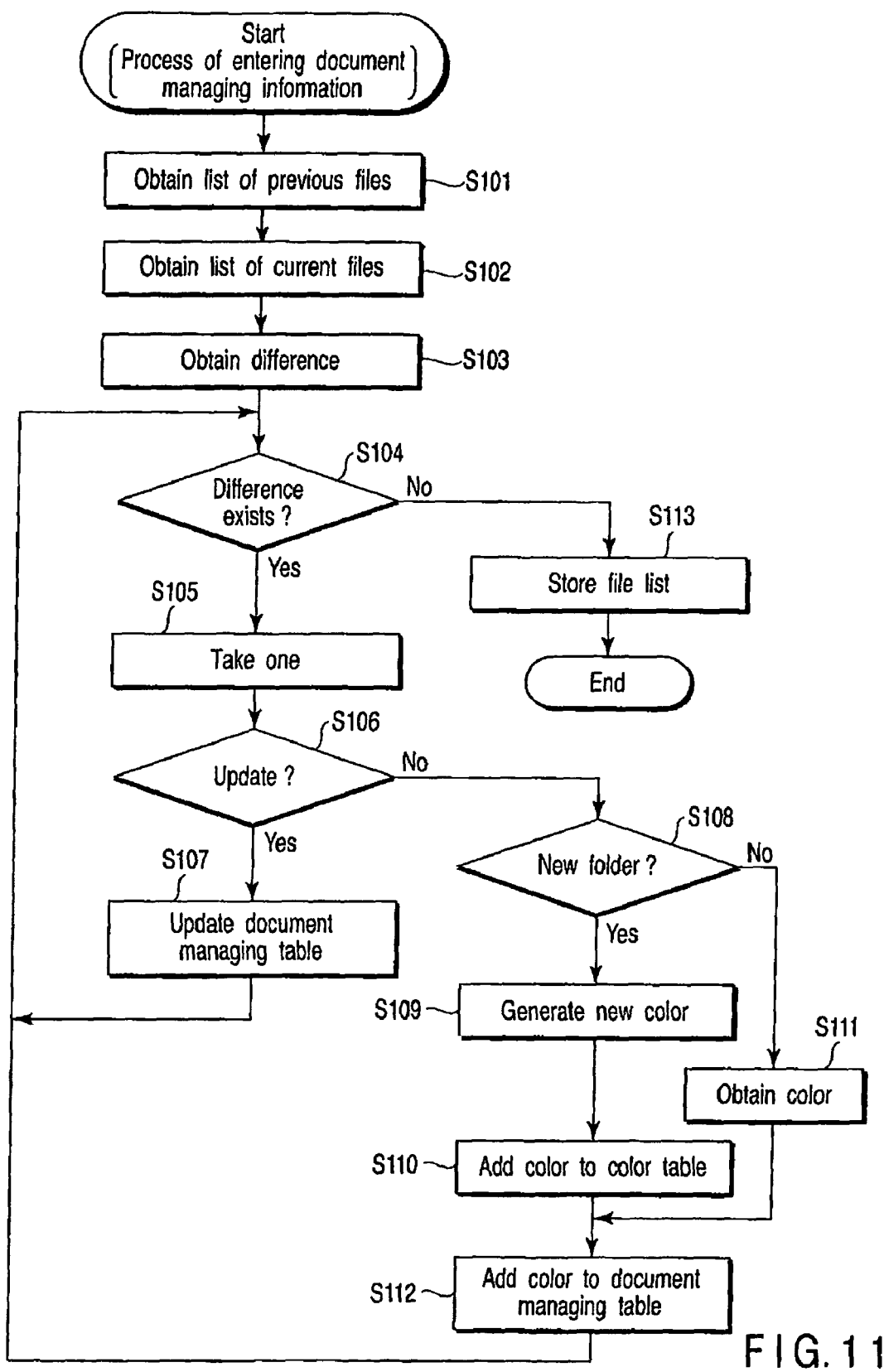
FIG. 11 is a flowchart for explaining a process of entering document managing information according to the embodiment.

FIG. 11 is a flowchart for explaining the process of entering the document managing information in the document managing apparatus 1.

When the document managing apparatus 1 is started up, i.e. when the PC as the document managing apparatus 1 starts up the document managing program 27, the CPU 11 reads the first file managing table 23 in the HDD 15 as the file information of the previous time (Step S101). When the first file managing table 23 is read, the CPU 11 reads the second file managing table 24 in the HDD 15 as the current file information (Step S102).

When the first file managing table 23 and the second file managing table 24 are read, the CPU 11 performs a difference file detecting process (Step S103). The difference between the managing information (previous file information) of all the files stored in the first file managing table 23 and the managing information (current file information) of all the files stored in the second file managing table 24 is detected in the difference file detecting process. The information which indicates the difference file detected by the difference file detecting process is temporarily stored in, e.g. the RAM 12.

In the difference file detecting process, the updated file or the newly added file is extracted since the previous file information is produced. In the embodiment, the access time should not be set at the detecting target as the difference file.

It is determined that the file which does not exist in the previous file information but exist in the current file information, i.e. the file which exists only in the second file managing table 24 is the newly added file.

It is determined that the file in which the update time in the current file information differs from the update time in the previous file information, i.e. the file in which the first file managing table 23 differs from the second file managing table 24 in the update time is the updated file.

It is determined that the file which does not exist in the current file information but exist in the previous file information, i.e. the file which exists only in the first file managing table 23 is the deleted file.

For example, in the process of detecting the difference file between the first file managing table 23 shown in FIG. 5 and the second file managing table 24 shown in FIG. 6, three files whose file names are "file8.txt", "file10.doc", and "file11.xls" are detected as the difference file.

In this case, the file "file8.txt" whose pass is "C:\folder2\file8.txt" has the different update time. Therefore, it is determined that the file "file8.txt" is the updated file.

The file "file10.doc" whose pass is "C:\folder3\file10.doc" and the file "file11.xls" whose pass is "C:\folder4\file11.xls" exist only in the second file managing table 24. Accordingly, it is determined that the file "file10.doc" and the file "file11.xls" are the newly added file.

When the difference file is detected by the difference file detecting process (YES in Step S104), the CPU 11 sequentially reads the managing information of the detected difference file to perform the process of updating the document managing table 25 (Step S105 to Step S112). The document managing table 25 updating process is repeatedly performed until the process is completed for all the difference files detected by the difference file detecting process.

Namely, when the difference file detected by the difference file detecting process exists (YES in Step S104), the CPU 11 reads the managing information of the difference file detected by the difference file detecting process one by one (Step S105). When the CPU 11 reads one difference file, the CPU 11 determines whether the difference file is the updated file (file whose update time is changed) or the newly added file (Step S106).

When the CPU 11 determines that the read difference file is the updated file (YES in Step S106), the CPU 11 performs the process of updating the managing information corresponding to the file in the document managing table 25 (Step S107).

When the CPU 11 determines that the read difference file is not the updated file, i.e. when the CPU 11 determines that the difference file is the newly added file (YES in Step S106), the CPU determines whether the difference file is the file which is stored in the newly produced folder or not (Step S108). In Step S108, whether the folder is the new folder is determined by whether the folder in which the file is stored is the folder in which the color is managed by the color managing table 26. Namely, it is determined that the folder in which the color is set in the color managing table 26 is the already-existing folder.

For the file whose pass is "C:\folder3\file10.doc", the color is already allocated to the folder of "C:\folder3" in the color managing table shown in FIG. 10. In this case, it is determined that the folder of "C:\folder3" is not the new folder. On the other hand, for the file whose pass is "C:\folder4\file11.xls", the color is not already allocated to the folder of "C:\folder4" in the color managing table shown in FIG. 10. In this case, it is determined that the folder of "C:\folder4" is the new folder.

When the CPU 11 determines that the folder is the new folder (YES in Step S108), the CPU 11 generates the color allocated to the new folder (Step S109). For example, the new color which is not allocated to other folder yet is allocated to the new folder. The unique color ID is allocated to the generated color. When the color allocated to the new folder is generated, the CPU 11 adds color information on the new folder to the color managing table 26 (Step S110). In the color information, the color and the color ID correspond to the new folder.

When the CPU 11 adds the color information on the new folder in which the difference file is stored, the CPU 11 performs a new document adding process (Step S112). In the new document adding process, the managing information on the document corresponding to the difference file is added to the document managing table 25.

When the CPU 11 determines that the folder is not the new folder (YES in Step S108), the CPU 11 obtains the color ID allocated by the color managing table 26 to the folder in which the file is stored (Step S111). In this case, the CPU 11 performs the new document adding process in which the managing information on the document corresponding to the difference file is added to the document managing table 25 (Step S112).

In the new document adding process of Steps S111 and S112, referring to the second file managing table 24 and the color managing table 26, the managing information of the document corresponding to the newly added file is generated.

For example, the update time of the difference file is used as the document time in the managing information on the document. The pass of the difference file is used for the file name in the managing information on the document. Unique information newly generated is used as the document ID in the managing information on the document in order to distinguish the document from the already-existing document. The color ID of the color corresponding to the folder stored in the difference file is used as the color ID in the managing information on the document. The header information on the difference file is used as the header information. However, the number of pages in the managing information on the document is left as the blank field, and the status in the managing information on the document is set at "update". This is because the number of pages in the managing information on the document is confirmed when the image data is generated from the file through the later-mentioned image generating process.

When the difference file is not detected through the difference file detecting process, or when the process is completed to all the difference files detected by the difference file detecting process (NO in Step S104), the CPU 11 stores the information, currently stored in the second file managing table 24 as the start-up file information, in the first file managing table 23 (Step S113). Accordingly, the file information in performing the difference file detecting process (in this time start-up) is stored in the first file managing table 23, which allows the information stored in the first file managing table 23 to be used as the previous file information in the next start-up.

Thus, the managing information on the document corresponding to the updated file and the managing information on the document corresponding to the newly added file are entered in the document managing table 25 while the statuses are set at "update". In the document whose status is "update", the status is changed to "completion" by the later-mentioned image generating process, and the number of pages is confirmed.

Then, the process of generating the document image will be described.

Figure 12:
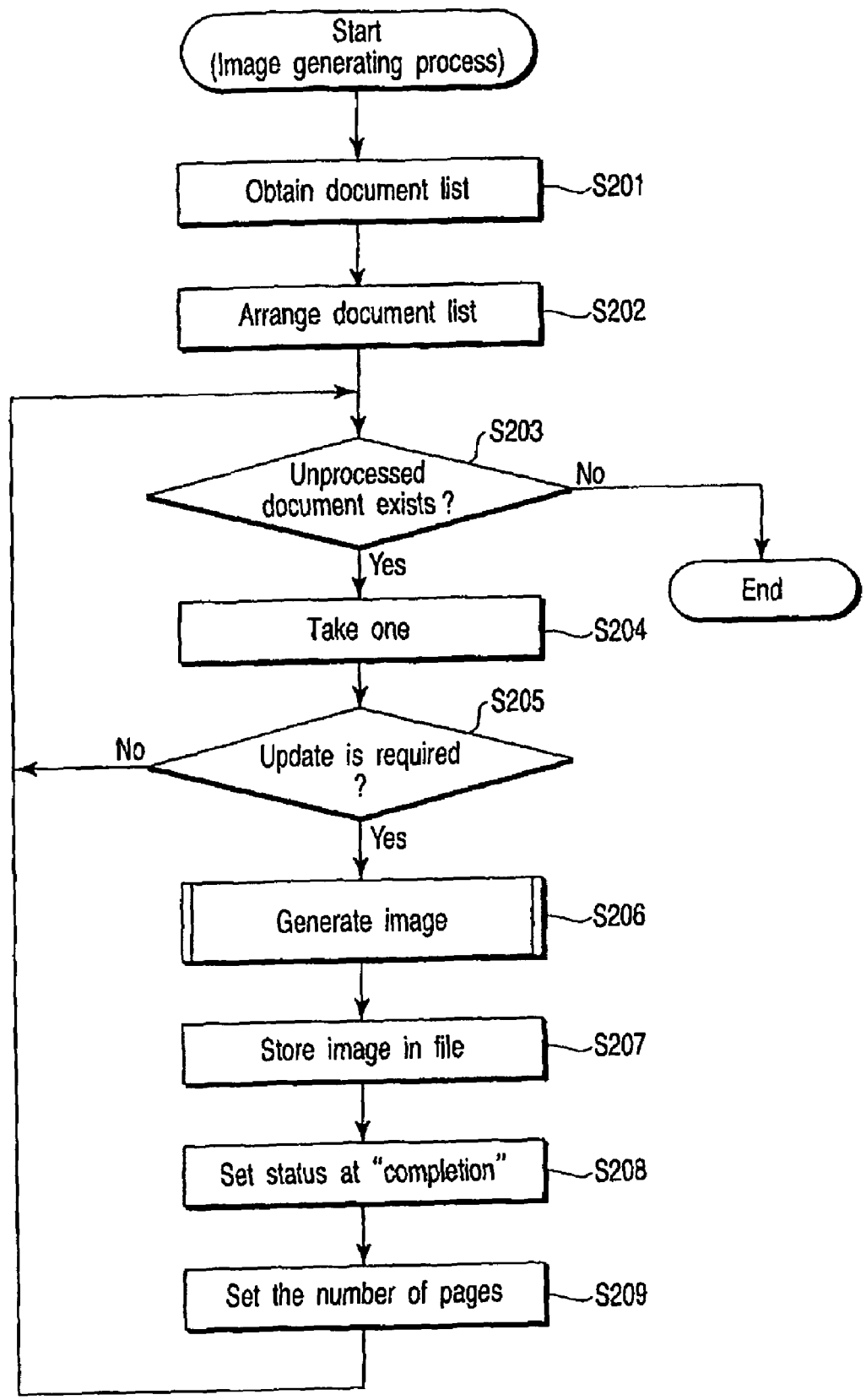
FIG. 12 is a flowchart for explaining an image generating process according to the embodiment.
Figure 13:
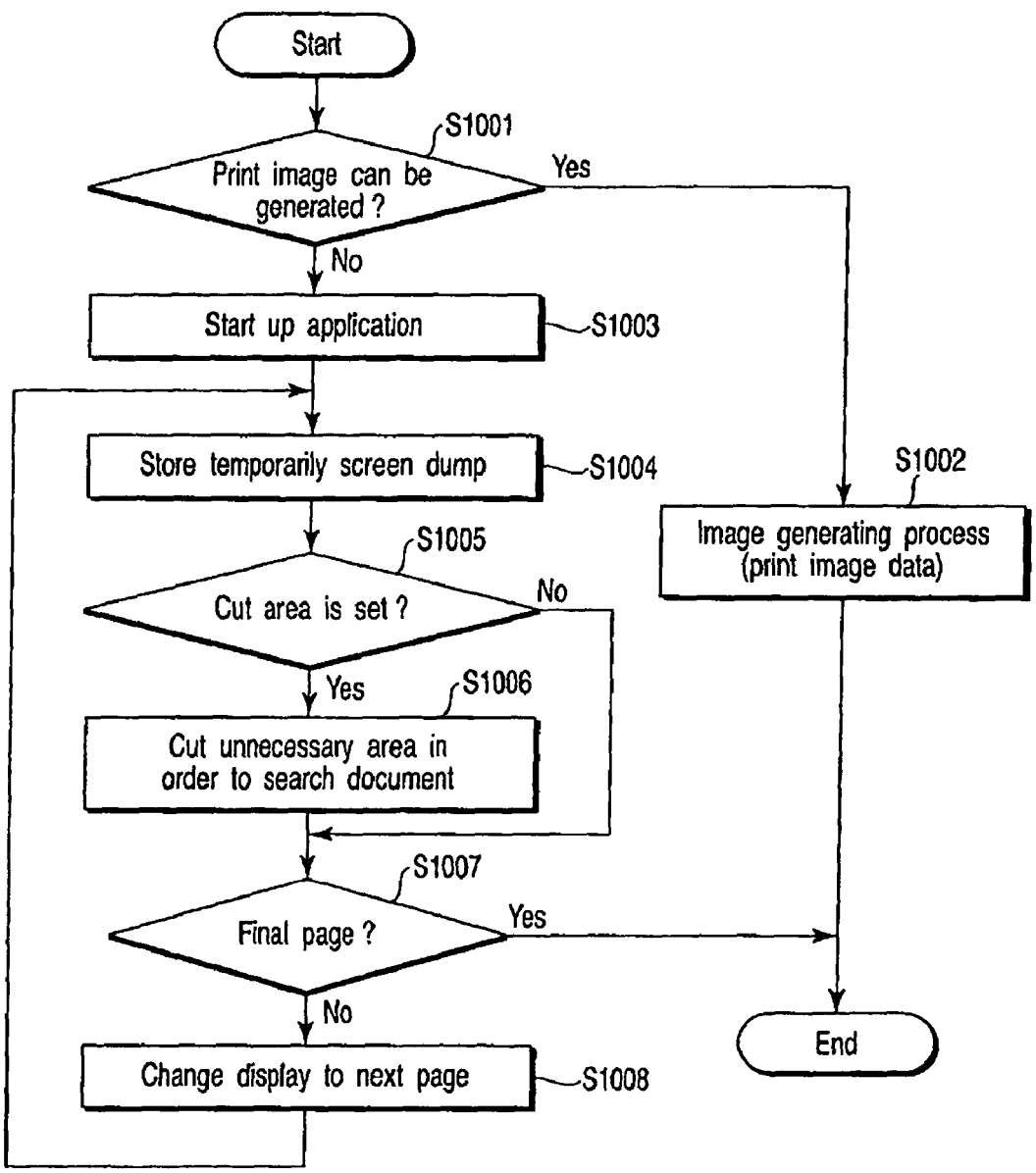
FIG. 13 is a flowchart for further explaining the process of image generating in FIG. 12 in detail according to the embodiment.

FIG. 12 is a flowchart for explaining the image generating process. FIG. 13 is a flowchart for further explaining the process of image generating in Step S206 of FIG. 12 in detail.

In the document managing information entering process, the pieces of managing information on the document corresponding to the updated file and the newly entered file are entered in the document managing table 25 while the statuses are "update". In the file whose status is "update", the display image is not generated. Therefore, for the document whose status is "update", it is necessary to generate the display image. The process of generating the display image of the document is referred to as image generating process.

When the document managing information entering process is completed, the CPU 11 performs the process of generating the display image. When the image generating process is started up, the CPU 11 reads all the pieces of managing information on the documents from the document managing table 25 (Step S201). When the managing information on the document is read from the document managing table 25, the CPU 11 sorts all the pieces of managing information on the documents based on the document time in the managing information on each document (Step S202). Therefore, in the document managing table 25, all the pieces of managing information on the documents are rearranged in the order of the document time (time-series order). For example, in FIG. 8, the latest three documents are the status of "update".

When all the pieces of managing information on the documents in the document managing table 25 are sorted based on the document time, the CPU 11 determines whether the document (unprocessed document) to which the image generating process is not performed exists or not (Step S203). When the CPU 11 determines that the unprocessed document exists, the CPU 11 reads the managing information on the unprocessed document in each document (Step S204).

When the CPU 11 reads the managing information on one unprocessed document, the CPU 11 determines whether the status of the managing information on the document read is "update" or not (Step S205). When the CPU 11 determines that the status is "update" (YES in Step S205), the CPU 11 performs the process of generating the display image of the document (Step S206). Referring to FIG. 13, the process will be described in detail later.

After the display image data is generated by the image generating process, the CPU 11 stores the image of each page (display image data of each page) which constitutes the document in the HDD 15 in the form of the image data file (Step S207). Therefore, the image data files of the number of pages which constitute the document are stored in the HDD 15. When the image data files of each page which constitute the document are stored in the HDD 15, the CPU 11 changes the status to "completion" in the managing information on the document in the document managing table 25 (Step S208). Further, the CPU 11 specifies the number of pages from the number of files generated as the image data, and sets the number of pages as the managing information on the document in the document managing table 25 (Step S209).

When the unprocessed document becomes nonexistent, i.e. when the statuses of all the documents become "completion" in the document managing table 25 (No in Step S203), the CPU 11 ends the image generating process.

As described above, in the embodiment, display image data of each document is generated as one file in each page of the document. The display image data of each document may be generated in any format. For example a JPEG format is used as display image data in the embodiment.

However, in each file of the display image data as the image of each page, the file name should be specified from the document ID and a page number. For example, the file of the display image data is stored in each name of "document ID-page number.jpg".

In the document managing table 25 shown in FIG. 8, the document of "C:\folder4\file11.xls" is formed by the images of three pages. In this case, in the process of generating the display image for the document of "C:\folder4\file11.xls", the pieces of display image data of three pages (three image data files in JPEG format) are generated.

As shown in FIG. 8, the document ID is "1011" in the document of "C:\folder4\file11.xls". Therefore, the three files of "1011-001.jpg", "1011-002.jpg", and "1011-003.jpg" are generated as the display image data of the document "C:\folder4\file11.xls".

In the managing information on the document whose document ID in document managing table 25 shown in FIG. 8 is "1011", the status is set at "completion", and the number of pages is set at "three" as shown in FIG. 9. FIG. 9 shows an example of the document managing table 25 when the image generating process is completed for the document managing table 25 shown in FIG. 8.

Then, referring to FIG. 13, the image generating process of Step S203 will be described.

When the CPU 11 determines that the status is "update" (YES in Step S205), the CPU 11 determines whether the print image of the document can be generated or not (Step S1001). The CPU 11 determines whether the print image can be generated such that the CPU 11 inquires of the application program which has produced the document whether the print image is produced and the CPU 11 makes the determination depending on the presence or absence of the response about the inquiry. For example, when the Windows OS of Microsoft is installed in the PC, the application programs which execute Word, Excel, and the like respond to the inquiry, however, the application programs which execute application programs that are compatible with computer aided design (CAD) do not respond to the inquiry.

When the CPU 11 determines that the print image can be generated (YES in Step S1001), the CPU 11 performs the image generating process in which the print image used for the display image is generated (Step S1002). In the image generating process, a bitmap image of each page which constitutes the document should be generated as the display image of the document.

When the CPU 11 determines that the print image cannot be generated (NO in Step S1001), the CPU 11 starts up the application program which has produced the document entered in the second file managing table 24 (Step S1003). Therefore, the document is displayed on the display device 17. In the case where the document has the plural pages, the first page is displayed on the display device 17.

When the document is displayed on the display device 17, the CPU 11 temporarily stores a screen dump of the display screen of the display device 17 in a predetermined area of the RAM 12 (Step S1004). Therefore, the first-page screen dump of the document is temporarily stored in the RAM 12.

Then, the CPU 11 determines whether a cut area of the screen dump is set in the application program, which is started up in order to display the document on the display device 17, or not (Step S1005). In the case where the document is displayed on the display device 17, an area such as a tool bar unnecessary during the document search is also displayed in addition to the contents of the document. Therefore, the setting to delete the area except for the area which shows the contents of the document is performed. Because the unnecessary area in searching the document depends on the application program, the setting of the cut area is previously set according to the application program. Thus, when the user performs the later-mentioned document search, the user can search the document in which the print image cannot be generated while watching the image closer to the print image by deleting the unnecessary area in searching the document such as the tool bar including menus and buttons.

When the CPU 11 determines that the cut area is set in the application program (YES in Step S1005), the CPU 11 deletes the unnecessary area in searching the document from the screen dump temporarily stored in the RAM 12 according to the setting of the cut area (Step S1006). When the CPU 11 determines that the cut area is not set (No in Step S1005), the CPU 11 skips the process in Step S1006.

When the first-page screen dump of the document is generated, the CPU 11 determines whether the page displayed on the display device 17 is the final page of the document (Step S1007). The CPU 11 can obtain both the number of pages and the total number of pages of the document displayed on the display device 17 from the running application program. The CPU 11 determines whether the page displayed on the display device 17 is the final page based on the number of pages and the total number of pages. When the CPU 11 determines that the page displayed on the display device 17 is not the final page (NO in Step S1007), the CPU 11 changes the display so that the next page of the document is displayed on the display device 17 (Step S1008). Therefore, the second page of the document is displayed on the display device 17.

Then, the CPU 11 temporarily stores the screen dump of the display screen of the display device 17 in the predetermined area of the RAM 12 (Step S1004). Therefore, the second page of the document is temporarily stored in the predetermined area of the RAM 12. The screen dumps of all the pages of the document, in which the print image cannot be generated, are temporarily stored as the display image in the RAM 12 by repeating the processes of Steps S1004 to S1008.

Accordingly, for the document in which the print image can be generated, the CPU 11 generates the print images of all the pages of the document as the display image data by Step S1002. Further, for the document in which the print image cannot be generated, the CPU 11 generates the screen dumps of all the pages of the document as the display image data by the processes of Steps S1003 to S1008. Thus, the display image data generated by the image generating process is stored as the image data file in the HDD 15 by Step S207.

It is possible that the image generating process is performed in parallel with another process. Namely, it is possible that the image generating process is performed in the background of another process. For example, in the case where there are many documents whose statuses are "update", or in the case where the number of pages of the document whose status is "update" is large, there is a possibility that it takes a long time to perform the image generating process. Therefore, even if the image generating process is being performed, it is also possible that the CPU 11 performs the later-mentioned process of displaying the document searching screen 40.

Then, the process of displaying the document searching screen (document searching display window) 40 will be described.

FIG. 14 is a flowchart for explaining a display process of the document searching screen 40.

When the document searching screen 40 is displayed (started up), the CPU 11 reads the pieces of managing information of all the documents stored in the document managing table 25 (Step S301). When the CPU 11 reads the pieces of managing information of all the documents stored in the document managing table 25, the CPU 11 arranges the pieces of managing information of all the documents read in the order of the latest document time (time-series order) (Step S302).

After the CPU 11 arranges the pieces of managing information of all the documents read in the time-series order, the CPU 11 reserves a storage area of the current document (display document) on the RAM 12. An information which indicates the currently displayed document is stored in the storage area of the current document. After the storage area of the current document is reserved, the CPU 11 sets the information which indicates the latest document in the storage area of the current document (Step S303). At this point, "order" stored as the managing information on the document in the document managing table 25 should be set as the information which indicates the current document at the storage area of the current document. Namely, the CPU 11 displays the currently displayed document (current document) in the "order" given to each document.

Further, the CPU 11 reserves a storage area of the current page (display page) on the RAM 12. An information which indicates the number of pages of the currently displayed document is stored in the storage area of the current page. After the storage area of the current page is reserved, the CPU 11 sets the information which indicates the representative page (first page in the embodiment) of the document in the storage area of the current page (Step S304). At this point, the number of pages should be set as the information which indicates the current document at the storage area of the current page.

Namely, the CPU 11 displays the representative page (first page) of the latest document as the initial display image. Therefore, the CPU 11 sets the current document at "1", and sets the current page at "1". When the CPU 11 sets the current document at "1", and sets the current page at "1", the CPU 11 obtains the display image data file of the page (the "1"-st page image in the document whose order is "1") (Step S305).

In the image obtaining process, the image data file of the page to be displayed referring to the document managing table 25 is specified. Namely, the CPU 11 refers to the document managing table 25 to obtain the document ID corresponding to "order" ("1" in this case) set at the current document. After the CPU 11 obtains the document ID of the current document, the CPU 11 specifies the image data file including the document ID and the page number of the current document from "page number" ("1" in this case) set at the current page.

For example, in the document managing table 25 shown in FIG. 9, the document ID whose order is "1" is "1011". The image file of the first page of the document ID "1011" is stored in the name of "1011-001.jpg". Accordingly, in the case where the current document is set at "1" and the current page is set at "1", the CPU 11 refers to the document managing table 25 shown in FIG. 9 to specify "1011-001.jpg" as the image data file.

After the image data file is obtained by the image obtaining process, the CPU 11 displays the image data of the file in the image display area 41 of the document searching screen 40 (Step S306). After the image data of the obtained file is displayed in the image display area 41, the CPU 11 performs a document map generating process (Step S307). In the document map generating process, the document map 42 showing all the documents in the time-series order is generated. The document map generating process will be described later.

After the document map 42 is created by the document map generating process, the CPU 11 displays the generated document map 42 in a predetermined display area in the document searching screen 40 (Step S308). When the document map 42 is displayed in the document searching screen 40, the CPU 11 specifies the position of the current document in the document map 42 (Step S309). After the position of the current document is specified, the CPU 11 displays the arrow 43 which indicates the position of the current document on the document map 42 (Step S310).

The initial screen is displayed as the document searching screen 40 in the display window on the display device 17 by the document searching screen displaying process.

Then, the document map generating process will be described.

Figure 15:
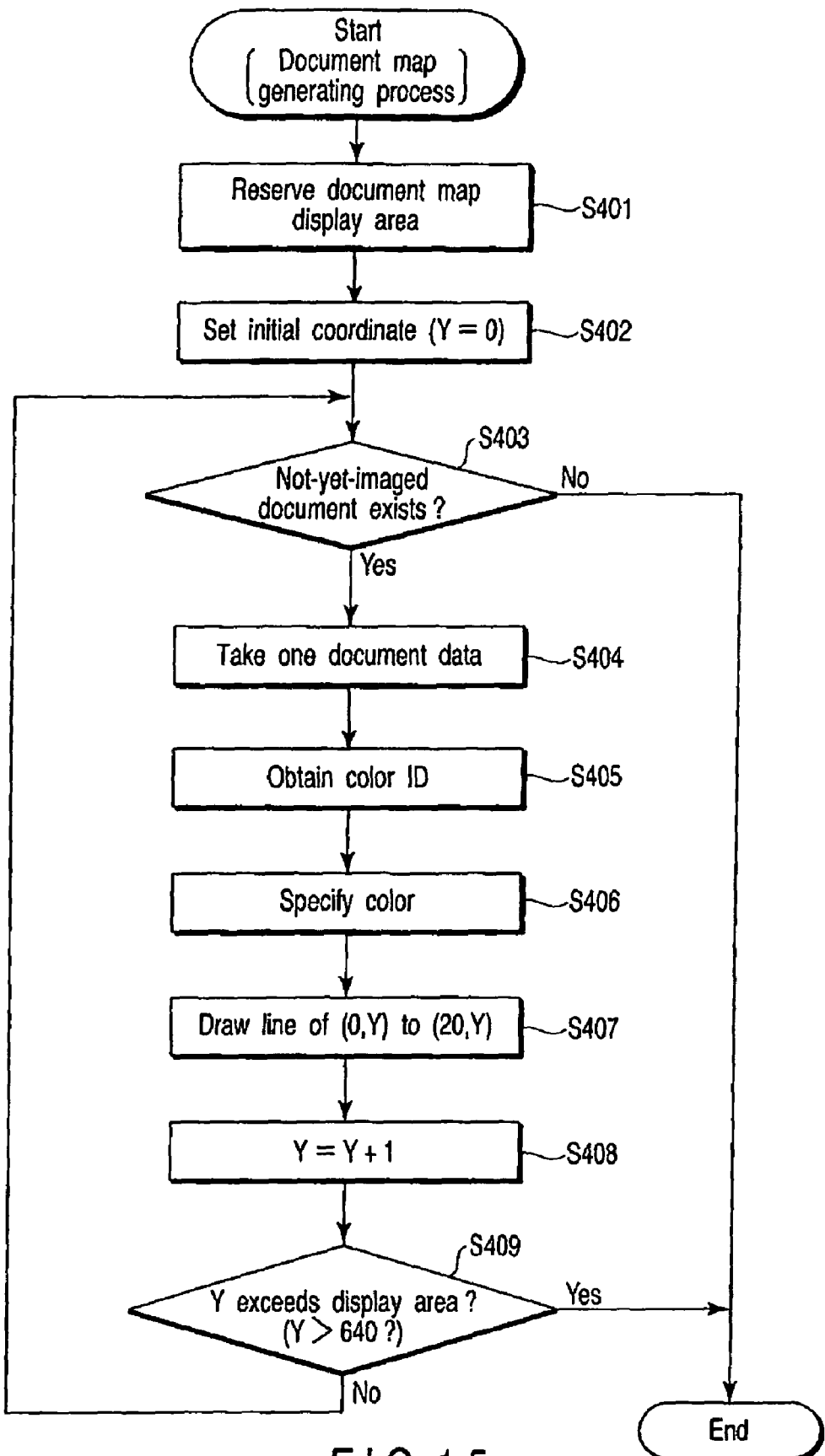
FIG. 15 is a flowchart for explaining a document map generating process according to the embodiment.

FIG. 15 is a flowchart for explaining the document map generating process.

When the process of generating the document map 42 is started, the CPU 11 reserves the display area to display the document map 42 in the document searching screen 40 (Step S401). The display area of the document map 42 should previously be set. In Step S401, the CPU 11 should display the reserved display area of the document map 42 in the color such as white as an initial value.

For example, as shown in FIG. 3, the display area of the document map 42 is set at the area having the size of a 20-pixel width and a 640-pixel height on the right end of the document searching screen 40. Assuming that the rectangle area is shown by coordinates (X,Y) of (0,0), (20,0), (0,640), and (20,640) as shown in FIG. 3, the display area of the document map 42 will be described.

After the display area of the document map 42 is reserved in the document searching screen 40, the CPU 11 sets an initial coordinate where imaging is started (Step S402). In this case, the initial coordinate is set at the uppermost end in the display area of the document map 42, and a Y-coordinate is set at "0" (Y=0).

After setting the initial coordinate, the CPU 11 reads the managing information on the document from the document managing table 25 in the order in which "order" is increased. Namely, the CPU 11 determines whether the document (not-yet-imaged document) in which the bar is not imaged in the display area of the document map 42 exists in the document managing table 25 or not. When the CPU 11 determines that the not-yet-imaged document exists in the document managing table 25 (Step S403), the CPU 11 reads the managing information on the document having the smallest "order" number in the not-yet-imaged documents (Step S404).

When the managing information on the document is read, the CPU 11 specifies the color ID allocated to the read document (Step S405). After the color ID of the document is specified, the CPU 11 refers to the color managing table 26 to confirm the actual color corresponding to the color ID of the document (Step S406). Therefore, the bar (line) which indicates the document in the document map 42 is imaged by the confirmed color.

After the color of imaging bar which indicates the document is specified, the CPU 11 images the bar (line) which indicates the document with the confirmed color at the current coordinate in the display area of the document map 42 (Step S407). The bar which indicates each document should be the line having the width (height) of one pixel in the Y-direction. In this case, for the first document, the bar having the width (height) of one pixel at the Y-initial coordinate ((0,Y) to (20,Y)) is imaged in the display area of the document map 42.

After the bar which indicates the document is imaged, the CPU 11 increments the coordinate in the Y-direction by one pixel by setting "Y=Y+1" (Step S408). When the CPU 11 increments the coordinate in the Y-direction by one pixel, the CPU 11 determines whether the coordinate in the Y-direction exceeds the display area of the document map 42 or not. When the CPU 11 determines that the coordinate in the Y-direction exceeds the display area of the document map 42 (YES in Step S409), the CPU 11 ends the process of generating the document map 42.

When the CPU 11 determines that the coordinate in the Y-direction does not exceed the display area of the document map 42 (NO in Step S409), the CPU 11 returns to Step S403. The CPU 11 repeats Steps S403 to S409 until the not-yet-imaged document does not exist in the display area of the document map 42. Namely, the processes of Steps S403 to S409 are repeatedly performed to all the documents managed by the document managing table 25.

The document map 42, in which the bar that indicates each document is displayed in the color corresponding to each document while stacked in the time-series order, is generated by the above-described processes.

Then, the document searching process will be described.

Figure 16:
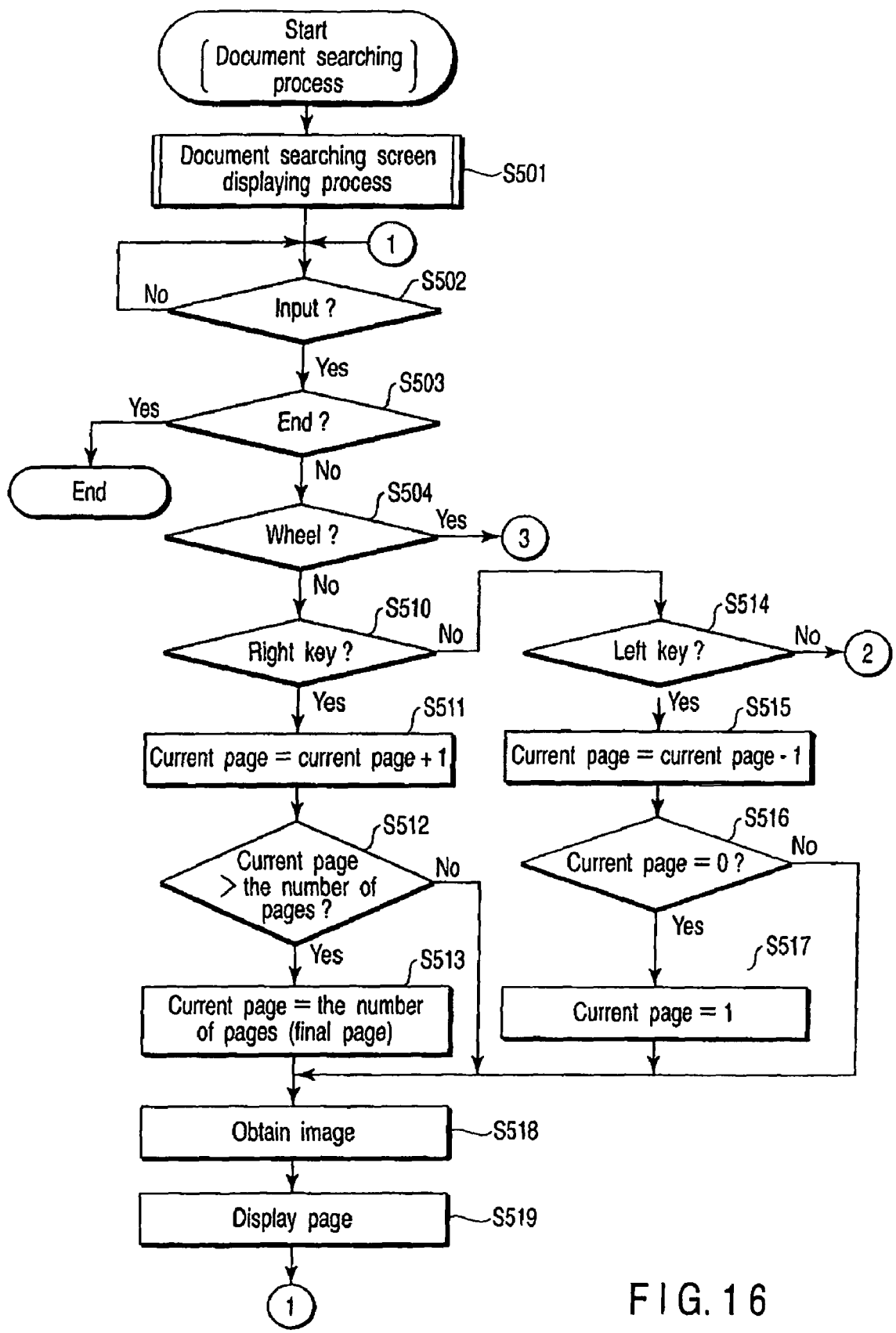
FIG. 16 is a part of a flowchart for explaining a document searching process according to the embodiment.
Figure 17:
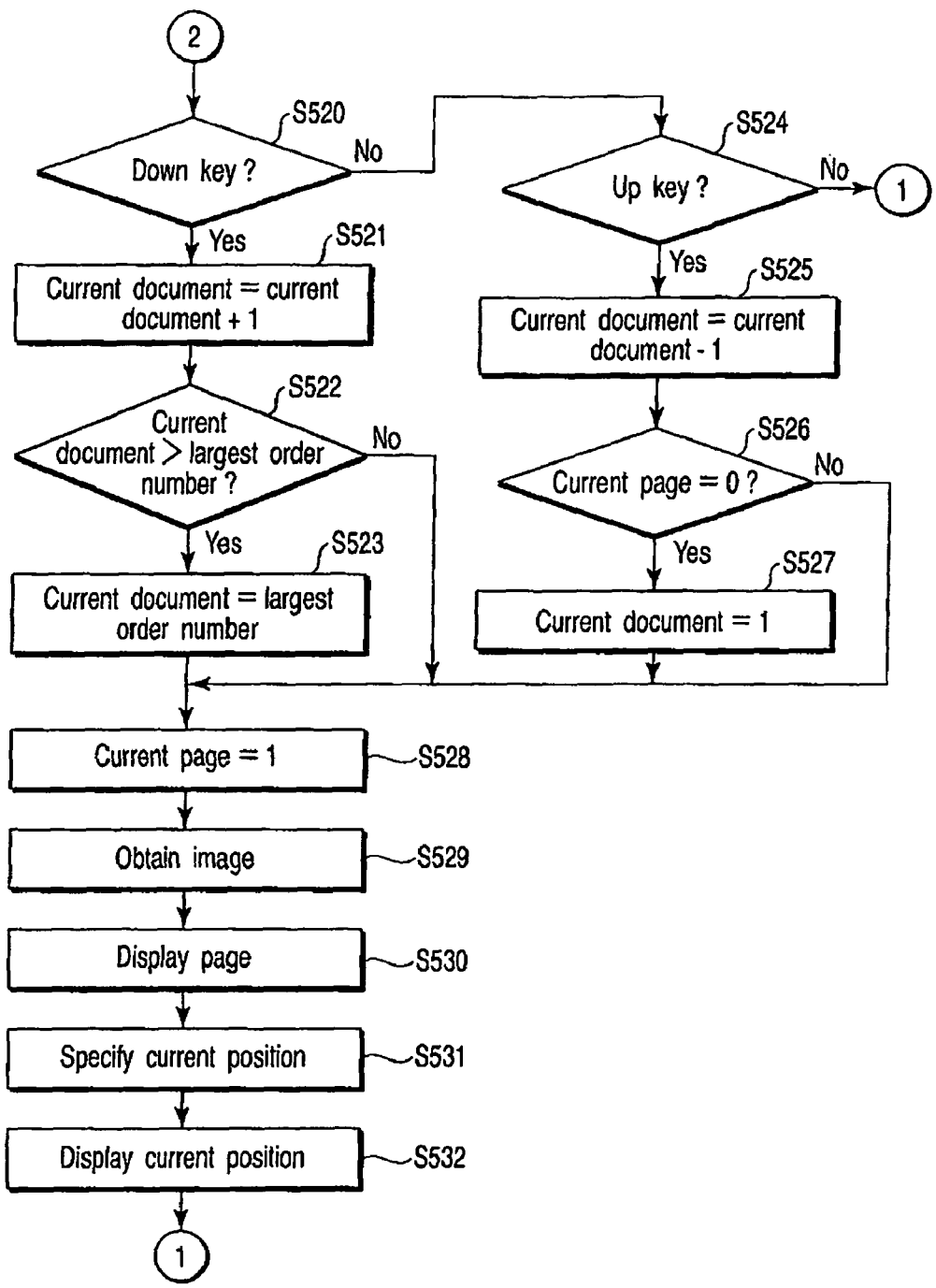
FIG. 17 is another part of the flowchart for explaining the document searching process according to the embodiment.
Figure 18:
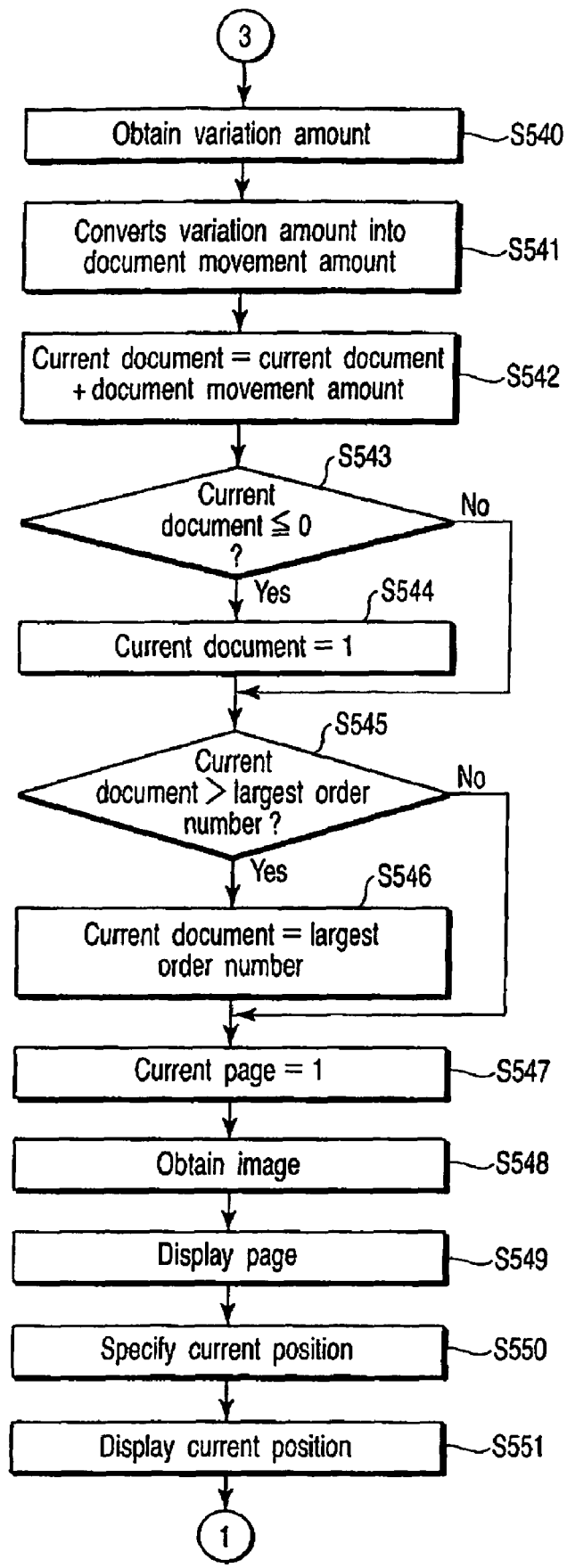
FIG. 18 is still another part of the flowchart for explaining the document searching process according to the embodiment.

FIGS. 16, 17, and 18 are flowcharts for explaining the document searching process.

At first the document searching screen 40 should be displayed on the display device 17 by the process of displaying the document searching screen. The first page image of the new document having the latest document time is displayed in the document searching screen 40 (Step S501).

In such a state, the CPU 11 waits for the user's input with the mouse 19 or the keyboard 21 (Step S502). Namely, the CPU 11 detects the presence or absence of the input to the mouse 19 or the keyboard 21. In the input to the wheel 34 of the mouse 19, the rotating amount of the wheel 34 in a predetermined time is inputted as a variation amount. In the input to each key of the keyboard 21 or the right and left buttons 32 and 33 of the mouse 19, the CPU 11 detects which key is inputted.

When the CPU 11 detects the input to the mouse 19 or the keyboard 21 (YES in Step 502), the CPU 11 determines whether contents of the inputted direction are an end direction or not (Step S503). When the CPU 11 determines that the contents of the inputted direction are the end direction (YES in Step S503), the CPU 11 turns off the document searching screen 40 and ends the process.

When the CPU 11 determines that the contents of the inputted direction are not the end direction (NO in Step S503), the CPU 11 determines whether the contents of the inputted direction are the input to the wheel 34 of the mouse 19 or not (Step S504).

When the CPU 11 determines that the contents of the inputted direction are not the input to the wheel 34 of the mouse 19 (YES in Step S504), the CPU 11 determines whether the contents of the inputted direction are the input to the right key giving the direction of the rightward movement (Step S510), whether the contents of the inputted direction are the input to the left key giving the direction of the leftward movement (Step S514), whether the contents of the inputted direction are the input to the down key giving the direction of the downward movement (Step S520), and whether the contents of the inputted direction are the input to the up key giving the direction of the upward movement (Step S525). When the keys except for the right key, the left key, the down key, and the up key are inputted, the CPU 11 returns to Step S502, and the CPU waits for the input again.

When the CPU 11 determines that the input is the right key (YES in Step S510), the CPU 11 increments the current page by one to set at "current page=current page+1" (Step S511). In this case, the CPU 11 obtains the number of pages of the current document from the document managing table 25, and the CPU 11 confirms whether the current page set in Step S511 exceeds the number of pages of the current document (Step S512). When the CPU 11 determines that the current page set in Step S511 exceeds the number of pages of the current document, the CPU 11 sets the current page at the number of pages of the current document, i.e. the final page of the current document (Step S513).

When the CPU 11 determines that the input is the left key (YES in Step S514), the CPU 11 decrements the current page by one to set at "current page=current page−1" (Step S515). In this case, the CPU 11 confirms whether the current page to be displayed is "0" or not (Step s516). When the CPU 11 determines that the current page set in Step S515 is "0", the CPU 11 sets the current page at "1", i.e. the first page of the current document (Step S517).

When the current page is changed through Steps S510 to S517, the CPU 11 obtains the document ID of the current document based on the corresponding relationship between "order" and "document ID" in the document managing table 25. When the document ID of the current document is obtained, the CPU 11 obtains the image file of the page by the document ID and the current page of the current document (Step S518). After the CPU obtains the image file of the page, the CPU 11 displays the image of the page in the image display area 41 of the document searching screen 40 (Step S519).

When the CPU 11 determines that the input is the down key (YES in Step S520), the CPU 11 increments the current document by one to set at "current document=current document+1" (Step S521). In this case, the CPU 11 obtains the largest order number ("order" of the document having the oldest document time) from the document managing table 25, and the CPU 11 confirms whether the current document set in Step S521 exceeds the largest order (Step S522). When the CPU 11 determines that the current document set in Step S521 exceeds the largest order, the CPU 11 sets the current document at the largest order number, i.e. the document having the oldest document time (Step S523).

When the CPU 11 determines that the input is the up key (YES in Step S524), the CPU 11 decrements the current document by one to set at "current document=current document−1" (Step S525). In this case, the CPU 11 confirms whether the current document set in Step S525 is "0" or not (Step S526). When the CPU 11 determines that the current document set in Step S525 is "0", the CPU 11 sets the current document at "1", i.e. the CPU sets the current document at the document having the latest document time (Step S527).

When the current document is changed through Steps S520 to S527, the CPU 11 sets the current page at "1" as the representative page of each document (Step S519). Therefore, when the current document and the current page are set, the CPU 11 obtains the document ID of the current document based on the corresponding relationship between "order" and "document ID" in the document managing table 25. When the document ID of the current document is obtained, the CPU 11 obtains the image file of the page by the document ID and the current page of the current document (Step S529). After the CPU 11 obtains the image file of the page, the CPU 11 displays the image of the page in the image display area 41 of the document searching screen 40 (Step S530).

Further, the CPU 11 specifies the position of the current document in the document map 42 in the document searching screen 40 (Step S531). When the position of the current document is specified, the CPU 11 displays the arrow 43 which indicates the position of the current document in the document map 42 (Step S532). It is also possible that the processes of Steps S531 and S532 are performed in parallel with the processes of Steps S528 to S530.

When the CPU 11 determines that the input to the wheel 34 of the mouse 19 exists (YES in Step S504), the CPU 11 obtains the rotating amount of the wheel 34 in the predetermined time as the variation amount (Step S541). The mouse driver 18 detects the rotating amount of the wheel 34. The mouse driver 18 informs the CPU 11 of the detected rotating mount of the wheel 34. Therefore, the CPU 11 is configured to obtain the rotating amount of the wheel 34 in the predetermined time as the variation amount.

After the CPU 11 obtains the variation amount, the CPU 11 converts the obtained variation amount into a document movement amount (Step S504). The document movement amount shall mean the number of documents which are changed in the display (the number of documents moved). The document movement amount should indicate the direction of the document movement. The relationship among the rotating amount of the wheel 34, the variation amount, and the document movement amount will be described in detail later.

In this case, the document movement amount is set at a positive value when the wheel 34 is rotated in a normal direction, and the documents are moved in the order of "order" of the documents in the movement direction. The document movement amount is set at a negative value when the wheel 34 is rotated in a reverse direction, and the documents are moved in the reversal order of "order" of the documents in the movement direction.

When the variation amount based on the rotating amount inputted to the wheel 34 is converted into the document movement amount (Step S541), the CPU 11 sets the current document at the document (current document=current document+document movement amount) which is moved by the document movement amount (Step S542). In this case, the CPU 11 confirms whether the current document set in Step S542 is not more than "0" or not (Step S543). When the CPU 11 determines that the current document set in Step S542 is "0" or less (YES in Step S543), the CPU 11 sets the current document at "1", i.e. at the document having the latest document time (Step S544).

When the CPU 11 determines that the current document set in Step S542 is more than "0" (NO in Step S543), the CPU 11 further obtains the largest order number ("order" of the document having the oldest document time) from the document managing table 25, and the CPU 11 confirms whether the current document set in Step S542 exceeds the largest order (Step S545). When the CPU 11 determines that the current document set in Step S542 exceeds the largest order (YES in Step S545), the CPU 11 sets the current document at the largest order number, i.e. the document having the oldest document time (Step S546).

When the current document is changed through Steps S540 to S546, the CPU 11 sets the current page at "1" as the representative page of each document (Step S547). Therefore, when the current document and the current page are set, the CPU 11 obtains the document ID of the current document based on the corresponding relationship between "order" and "document ID" in the document managing table 25. When the document ID of the current document is obtained, the CPU 11 obtains the image file of the page by the document ID and the current page of the current document (Step S548). After the CPU obtains the image file of the page, the CPU 11 displays the image of the page in the image display area 41 of the document searching screen 40 (Step S549).

Further, the CPU 11 specifies the position of the current document in the document map 42 in the document searching screen 40 (Step S550). When the position of the current document is specified, the CPU 11 displays the arrow 43 which indicates the position of the current document in the document map 42 (Step S551). It is also possible that the processes of Steps S550 and S551 are performed in parallel with the processes of Steps S547 to S549.

In the above processes, the variation amount according to the rotating amount of the mouse wheel inputted by the user is converted into the document movement amount to change the document which displays the first-page image on the display device according to the document amount movement, which allows the document that displays the first-page image to be efficiently changed by rotating the wheel 34 of the mouse 19. As a result, the user can efficiently search the document managed by the document managing apparatus 1, and easily find out the desired document.

Then, the relationship among the rotating amount of the wheel 34 of the mouse 19, the variation amount, and the document movement amount will be described.

The relationship between the rotating amount of the wheel 34 of the mouse 19 and the document movement amount obtained by the CPU 11 is previously set by the setting information and the like. The relationship between the variation amount and the document movement amount, which are obtained by the CPU 11, is also previously set by the setting information and the like. The user can change the pieces of setting information to an arbitrary value.

For example it is assumed that the variation amount is set at "2880" for one rotation of the wheel 34 of the mouse 19. In this case, when the number of documents moved is set at "1" for the variation amount of "1", the 2880 documents are moved with respect to the one rotation of the wheel 34. This means that, in the image (image of the representative page of each document) displayed in the image display area 41, the images of 2880 documents are changed by one rotation of the wheel 34.

According to the embodiment, for the document in which the print image cannot be generated, the screen dump of the document displayed on the display device 17 is stored as the print image file for display in the HDD 15. Namely, both the document in which the print image can be generated and the document in which the print image cannot be generated are stored as the print image file for display in the HDD 15. Therefore, when the user searches the document in the document searching screen 40 using the mouse 19 or the keyboard 21, the user can search both the document in which the print image can be generated and the document in which the print image cannot be generated in the document searching screen 40.

Accordingly, the document managing apparatus 1 can improve the efficiency in searching the document, when compared with the conventional case where the document in which the print image cannot be generated is separately searched.

In the embodiment, the function of realizing the invention is previously recorded in the apparatus. However, the invention is not limited to the embodiment. It is also possible that the same function is downloaded from the network to the apparatus, or that the same function is stored in a recording medium and installed in the apparatus. Any recording medium can be used, as long as the program can be stored in the recording medium such as a CD-ROM and read by the apparatus. It is possible that the function obtained by the previous installation and download is realized in association with an operating system (OS) and the like in the apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document managing apparatus comprising:
   a determining unit which determines whether a document print image can be generated or not if process of generating a display image is not performed on a document stored in a file storage unit, the data file constituting the document which is a managing target;
   an application start-up unit which starts up an application program according to the document if the determining unit determines that the document print image cannot be generated;
   a screen dump generating unit which generates a screen dump of each page of the document entered as the file in the file storage unit based on the document displayed on a display unit by the application program started by the application start-up unit;
   a final page determining unit which determines whether the screen dump is a final page in the document or not, the screen dump being generated by the screen dump generating unit; and
   a page changing unit which changes the document displayed on the display unit to a next page in order to generate the screen dump of the next page if the final page determining unit determines that the screen dump is not the final page.

2. The document managing apparatus according to claim 1, further comprising an area deleting unit which deletes an area from the screen dump according to the application program, the screen dump being generated by the screen dump generating unit, the area excepting an image area which shows contents of the document.

3. The document managing apparatus according to claim 2, wherein the area except for the image area is the area of a tool bar.

4. The document managing apparatus according to claim 1, further comprising:
   a print image generating unit which generates the document print image if the determining unit determines that the document print image can be generated, the document print image being entered as the file in the file managing information.

5. A non-transitory computer-readable storage medium, storing a document managing program, which, when executed on a processor performs an operation comprising:
   determining whether a document print image can be generated or not if a process of generating a display image is not performed on a document stored in a file storage unit, the data file constituting the document which is a managing target;
   starting up an application program according to the document if it is determined that the document print image cannot be generated;
   generating a screen dump of each page of the document entered as the file in the file storage unit based on the document displayed on a display unit by the application program;
   determining whether the screen dump is a final page in the document or not; and
   changing the document displayed on the display unit to a next page in order to generate the screen dump of the next page if it is determined that the screen dump is not the final page.

6. The non-transitory computer-readable storage medium according to claim 5, further comprising:
   deleting an area from the screen dump according to the application, the area excepting an image area which shows contents of the document.

7. The non-transitory computer-readable storage medium according to claim 6, wherein the area except for the image area is the area of a tool bar.

8. The computer-readable storage medium according to claim 5, further comprising:
   generating the document print image if it is determined that the document print image can be generated, the document print image being entered as the file in the file managing information.

9. A method of generating an image of a document managed by a document managing apparatus, the method comprising:
   determining whether a document print image can be generated or not if a process of generating a display image is not performed on a document stored in a file storage unit, the data file constituting the document which is a managing target;
   starting up an application program according to the document if it is determined that the document print image cannot be generated;
   generating a screen dump of each page of the document entered as the file in the file storage unit based on the document displayed on a display unit by the started-up application program;
   determining whether the generated screen dump is a final page in the document or not; and
   changing the document displayed on the display unit to a next page in order to generate the screen dump of the next page, if it is determined that the screen dump is not the final page.

10. The method according to claim 9, further comprising:
    deleting an area from the generated screen dump according to the application, the area excepting an image area which shows contents of the document.

11. The method according to claim 9, further comprising:
    generating the document print image if it is determined that the document print image can be generated, the document print image being entered as the file in the file managing information.

* * * * *